United States Patent [19]

Sumner et al.

[11] Patent Number: 4,776,138

[45] Date of Patent: Oct. 11, 1988

[54] BURIED VAULT FOR UNDERGROUND OPTICAL FIBER SYSTEMS

[76] Inventors: Cyril R. Sumner, 7102 El Sereno, Houston, Tex. 77083; D. Michael Kimbrell, 3412 W. El Paso, Broken Arrow, Okla. 74012

[21] Appl. No.: 12,020

[22] Filed: Feb. 9, 1987

[51] Int. Cl.$^4$ .............................................. E02D 29/10
[52] U.S. Cl. ....................... 52/20; 52/169.6; 52/169.14; 52/249; 52/309.8; 109/1 S; 220/449
[58] Field of Search ............. 52/19, 20, 169.6, 169.14, 52/245, 249, 309.1, 309.8; 109/1 R, 1 S, 50; 220/3.2, 449, 460

[56] References Cited

U.S. PATENT DOCUMENTS

| | | | |
|---|---|---|---|
| 3,097,166 | 7/1963 | Monson | 210/170 |
| 3,224,622 | 12/1965 | Kordyban et al. | 220/449 X |
| 3,505,769 | 4/1970 | Miron et al. | 52/249 |
| 3,650,795 | 3/1972 | Wilfingham | 427/133 |
| 3,695,968 | 10/1972 | Morrison | 156/216 |
| 3,813,837 | 6/1974 | McClain et al. | 52/309.1 |
| 4,089,139 | 5/1978 | Moffa et al. | 52/20 |
| 4,123,582 | 10/1978 | Musyt | 428/335 |
| 4,242,847 | 1/1981 | Rezin | 52/169.6 |
| 4,256,525 | 3/1981 | Allen | 156/245 |
| 4,275,757 | 6/1981 | Singer | 137/363 |
| 4,443,520 | 4/1984 | Braithwaite | 428/438 |
| 4,464,215 | 8/1984 | Cogliano | 156/71 |
| 4,467,015 | 8/1984 | Clem | 428/454 |
| 4,655,024 | 4/1987 | Grace et al. | 52/745 |

FOREIGN PATENT DOCUMENTS 1138882 1/1969 United Kingdom ............ 52/309.8

Primary Examiner—John E. Murtagh
Assistant Examiner—Andrew Joseph Rudy
Attorney, Agent, or Firm—Gunn, Lee & Jackson

[57] ABSTRACT

A buried vault for telecommunication equipment is disclosed. It is adapted to connect with telecommunication conduits, especially optical fiber conduits enclosing optical fibers. The vault encloses laser light generating devices for providing signals and also encloses suitable signal switch gear for telecommunication circuitry. The wall is constructed of alternating plies of glass fibers matting and woven roving, each layer being applied and joined with a polymeric resin. It is then covered with a light weight layer, the preferred form being balsa wood and the outside surface is then sprayed with a skin, typically a polyester resin co-mingled with chopped reinforcing fibers of random lengths randomly distributed or glass fibers matting and woven roving plies.

7 Claims, 1 Drawing Sheet

BURIED VAULT FOR UNDERGROUND OPTICAL FIBER SYSTEMS

BACKGROUND OF THE DISCLOSURE

Telecommunications heretofore has used massive buried conduits which enclose many pairs of conductors. A single pair provides telephone service to a single resident or office telephone system. Such cables are typically armored cables which are buried several feet below ground, and when they become sufficiently large, they are buried inside large tile pipes having a number of parallel passages therethrough. Periodically, it is necessary to interconnect conduits at underground facilities. With the advent of fiber optics, size of the conduit can be reduced substantially. Rather than a large armored cable of substantial weight holding hundreds or perhaps thousands of pairs of conductors, a more convenient approach is now available, namely a small optical fiber which is able to carry a large number of communications paths. While there is only a single optical fiber in a minimum installation, it can transmit multitudinous isolated signals and provide the equialent of several hundred pairs of conductors. Typically, an optical fiber to be buried underground is first placed inside a fairly large diameter plastic tubing or pipe. It serves as a guide and provides protection against the intrusion of water, collapsing under the overhead burden and the like. Periodically, the optical signal must be boosted and to this end, it is necessary to periodically interrupt the fiber with laser generators. This equipment typically includes the necessary switch gear to route several conductor pair equivalents on alternate system routes. Thus, the optical fiber at such an equipment installation may pick up several other lateral optical fibers, or perhaps the old styled armored cable having individual conductor pairs. In any event, it is necessary to install a set of switch gear which provides appropriate interconnection from individual pairs into the optical fiber transmission system. Such equipment also must typically enclose and house a laser generating system which forms the light placed on the optical fiber for transmission of the modulated signal.

With this background in mind, it should then be observed that the optical fiber transmission system periodically must connect with a buried vault to thereby house the laser generating apparatus and also the switch gear necessary for connecting individual conductor pairs into the system. The vault must be fairly rugged and durable to exclude the external atmosphere to thereby house and protect the more sensitive electronic equipment. This includes the laser generating devices and the switch gear necessary for connection of a multitude of conductor pairs. This requires an environmentally regulated interior. Heretofore, such a structure has been fabricated something in the fashion of a storm shelter. Typically, it is assembled above the surface and is made of separable sections. The ordinary construction heretofore has been a skeleton made of reinforcing bars or wire mesh with concrete walls. This provided a very strong structure which is able to hold up the weight of the burden and to provide the necessary safe environmental climate. A typical construction has provided internal dimensions upwards of 24' length by perhaps 6' width and a ceiling height of 9'. Because the wall thickness is relatively thick to assure a substantial structure, the gross weight is approximately 40 tons or more. Handling a 40 ton structure is somewhat difficult; often such concrete vaults have been fabricated in sections for easier transport. Then, at the time of installation and burial, it is necessary to assemble the sections together with some kind of sealant between the sections to assure exclusion of artesian water.

This structure is directed to a vault providing substantial structural strength with a built up wall thereby assuring exclusion of ground water. Moreover, it enables an isolated interior so that the environment can be totally controlled. This enables the fabrication of what is in actual practice a seamless structure which therefore requires no joint seals at the time of installation. In a device of comparable size, the weight is reduced by almost 70,000 pounds, or at least 35 tons weight reduction. This simplifies transportation, and reduces the size of the handling equipment for installation.

One reference of a protective system is set forth in U.S. Pat. No. 3,650,795. Certain mechanical and chemical properties are obtained through the use of this system. It does not necessarily lend itself to the type of buried vault which is set forth in the present disclosure. Another reference of note is U.S. Pat. No. 3,695,968. This discloses a built-up plywood layer with an encapsulation system. U.S. Pat. No. 4,123,582 is directed to a multi-layer system using a polymeric film in the method of construction to yield a multi-layered device. In U.S. Pat. No. 4,443,520 a coating for combustible materials (wood and the like) yields fireproofing by the use of alumina and glass fibers to form a refractory coating. The composite materials set forth in this disclosure provide a strong and durable structure which is able to sustain the weight of the burden overhead and yet isolates the atmosphere to define a controlled environment. The structure further yields a seamless type construction which does not require joint sealing and the like. This permits the delicate electronic equipment to be installed on the interior and connected with an optical fiber for transmission of telecommunication signals. All the optical fiber distribution system and the associated electronic equipment is thus buried underground and therefore is made safe and secure from inclement weather, protected from vandalism and is otherwise assured of the best operating conditions.

The present invention is summarized as a buried vault having an interior sufficiently large and configured for installation of laser generating equipment and the associated electronics for telecommunication systems communicating through optical fibers, and is otherwise constructed with a closed chamber. There is a chimney portion which is adapted to extend upwardly to provide easy access through a closed entry. Further, the chimney encloses an outlet for venting of heating and air conditioning equipment. The device is constructed in a seamless fashion with multiple layers of woven roving and fiberglass matting to define multiple sheets which are joined together with a suitable polymeric resin. This defines an interior surface of the structure. A light weight core in sheet form is placed over this, and the exterior is then applied with a curable polymeric resin having randomly distributed random length cuts of chopped fiberglas and layers of woven roving and fiberglass matting. On the interior, a gel coating is provided to assure easy mold release. The structure is fabricated to define a vault of the described construction having such a chimney. Ideally, the device is fabricated in such a fashion as to be seamless in construction. At this juncture, the only points of entry are those formed to receive the optical fiber cables and conduits, and the chimney is constructed with a vent and hatch for human entry.

IN THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED AND ILLUSTRATED EMBODIMENT

Figure 1:
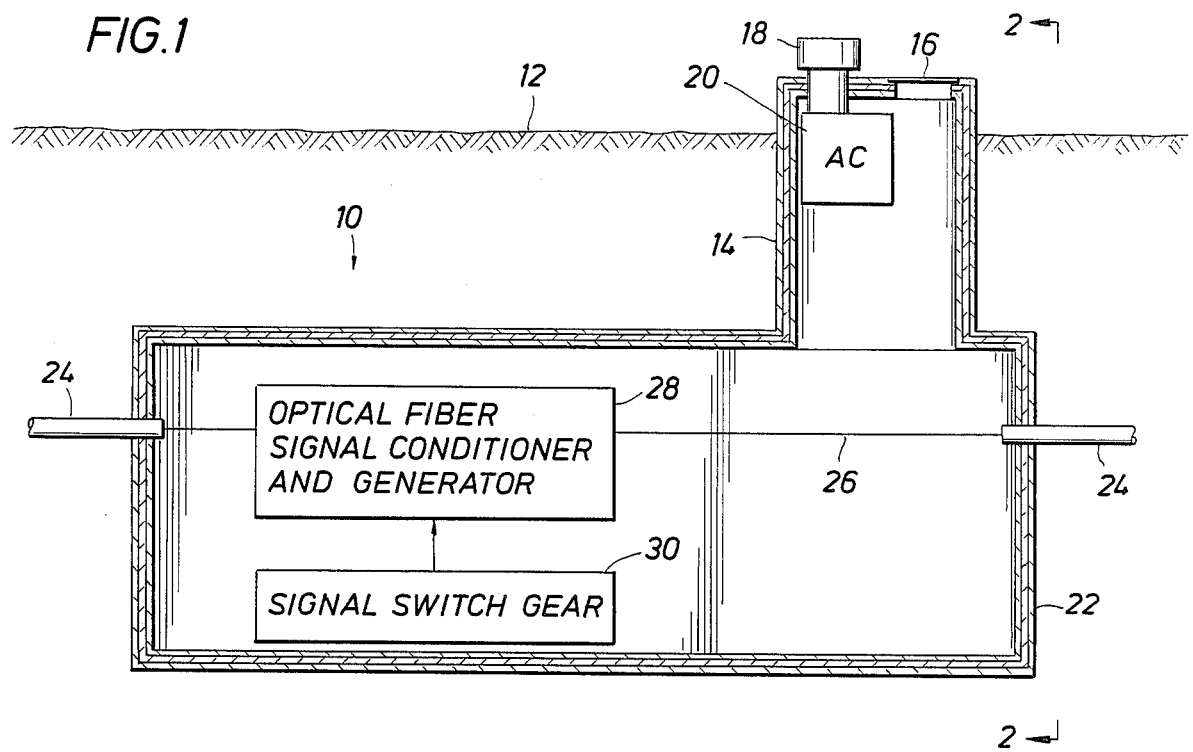
FIG. 1 shows the buried vault of the present disclosure installed in a telecommunication system wherein the vault encloses the appropriate laser generating apparatus, associated signal switch gear and the like, all in a protected environment.

Attention is first directed to FIG. 1 of the drawings where a buried vault 10 constructed in accordance with this disclosure is shown underground. There is an overhead burden 12 above the vault. The vault is buried at least several inches and usually many feet deep in the ground. The vault has a main body portion and an upstanding chimney 14. The chimney has a height enabling it to extend through the ground and thereabove. The chimney is sufficiently large that a person can enter through a door 16. This door has the form of a hatch which is open and closed. It is locked in place, and to protect against vandalism, other security means can be used including a surrounding fence and the like. The upstanding chimney has a vent 18 for exchanging air so that fresh air is available to the interior of the vault 10. The chimney also supports air-conditioning equipment 20, this being connectd with the vent 18 to eject surplus heat, provide an interchange of fresh air to avoid staleness, and to otherwise regulate the interior environment. The air conditioner 20 is a bought item and is preferably adapted to regulate the interior temperature and humidity to that required for operation of the equipment. As will be understood, a suitable electric distribution system is connected to the air conditioning equipment 20. Electrical power is also furnished to the interior of the vault 10 as required.

The vault includes a lower portion which is generally identified by the numeral 22. It is generally rectangular is shape. The interior clear space is ideally about 24' in length, 6' in width and 9' in height referring to the inside dimensions. The ceiling enables one to stand erect. Lower portion 22 will thus be described as the equipment room in view of the fact that a major portion of equipment placed therein is the optical laser and switching equipment. The equipment room 22 thus joins to the chimney 14 to permit personnel to enter in this area and service the quipment therein.

An optical fiber conduit 24 is buried underground. It typically is in the range of about one of two inches in diameter. It encloses an optical fiber 26. The conduit passes through the wall of the equipment room, and is sealed thereat by use of suitable tape and caulking material and excludes entry of artesian water along the conduit 24. Suitable fittings can be installed to assure the quality of this entry. The optical fiber 26 connects with a signal conditioner and generator indicated generally at 28. That is driven by signal switch gear 30. As desired, a switch board can be provided in the equipment room 22. More importantly, all of the equipment is secured for safety to assure its proper and continued operation without failure. The equipment in the vault is isolated and protected from inclement weather by the vault 10 and is therefore able to operate indefinitely without interruption. The equipment that is in the vault 10 is arranged typically in racks along the vault walls, and to this end, suitable hangers and connectors can be used to attach the equipment for standing upright. The racks are also supported on frames resting on the floor of the vault. For complete anchoring, the supportive framework can be bolted to mounting plates abutted against the floors and walls to assure structural integrity of the installed equipment. FIG. 1 shows the conduit 24 entering at two locations, but it will be appreciated that the vault of the present disclosure can be installed and connected with more than two conduits providing optical fibers. Likewise, conventional wired conductor pairs, either individually or in a coaxial wrapped cable can be connected to the equipment. Several points of entry may exist into the vault.

Figure 2:
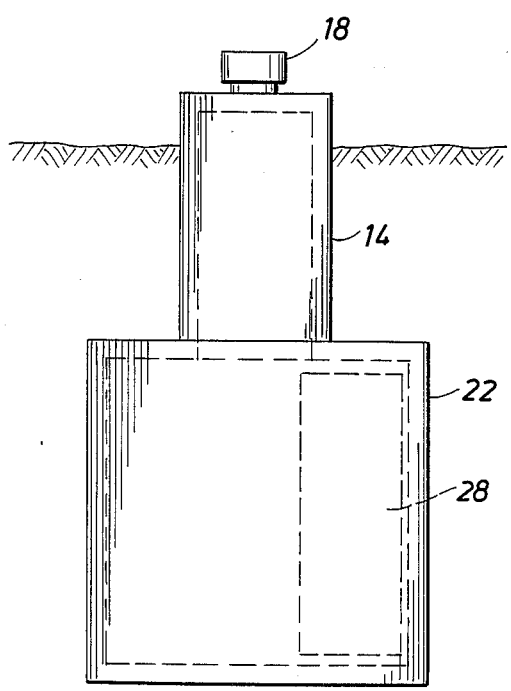
FIG. 2 is an end view of the apparatus shown in FIG. 1 showing additional details of its shape and profile.

As shown in FIG. 2 of the drawings, the vent 18 extends above the surface. It is appended at the top end of the chimney 14 connected above the equipment room 22. The vault is generally rectangular and has the approximate dimensions mentioned above in the preferred embodiment. Moreover, it is constructed so that there are no joints or seams which are required to be attached and sealed at the time of burial. That is, it is constructed as described below so that the chimney joins to the equipment room with a seamless construction to prevent leakage at the corners or edges.

Figure 3:
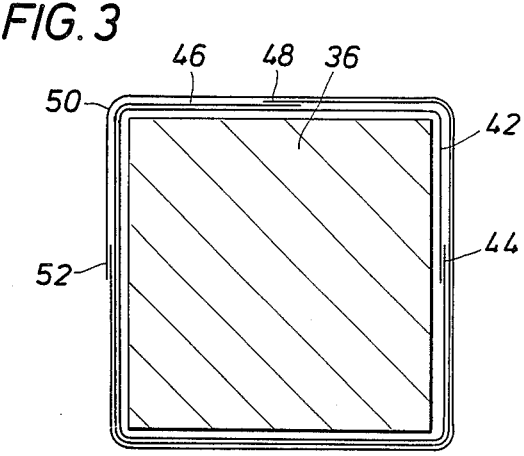
FIG. 3 shows a core having multiple wraps of material therearound wherein the buried vault is built up by placing one layer over the next in the described manner and further illustrating placement of the seams so that they are overlapped and isolated from other seams.
Figure 4:
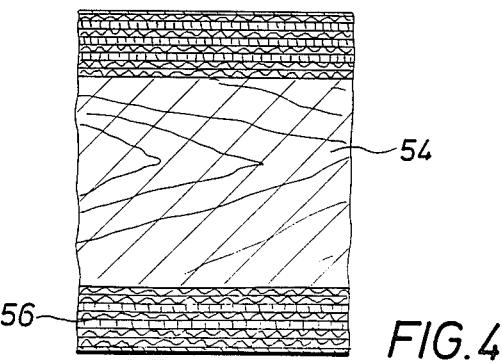
FIG. 4 is a sectional view through the wall of the completed vault showing the layers of the vault wall.

Going now to FIG. 3 of the drawings, the numeral 36 identifies a mold. It is shaped to the size and dimensions of the equipment room 22. It is first coated with a gel coat 38 around the surface. The mold 36 is thus coated with the gel coat to ease removal. The gel coat is applied evenly over the surface to a thickness of perhaps 5 to 20 mils. It helps the mold slip out of the partially completed vault as will be described. Over the mold and after placing the gel coat on it, a first layer is wrapped on four sides. The layer 42 completely encircles and has an overlap at 44. It is formed in the fashion of a sleeve to the shape of the mold. This sleeve thus forms an overlapped seam with itself at 44. After it is positioned on the mold 36, it is sprayed or coated in a suitable curable polymeric (polyester or epoxy as examples) resin. The next layer is applied over that after curing. The next layer is identified by the numeral 46. It has a seam overlap at 48. The third layer 50 has an overlap 52. The seams or overlaps 44, 48 and 52 are located away from one another to avoid a large bead under the surface and to also assure that there is no mechanical weakness by coincidence by all the beads or seams.

This deployment of the various overlap seams enhances the uniform strength of the completed structure from every direction. After about two or three layers have been built up, the partially made vault becomes rigid. Rigidity is aided and assisted by coating each layer with a suitable sprayed on or otherwise applied polyester resin layer. The layers are alternating layers of glass fibers matting and woven roving made of glass fibers materials. They are wrapped around to build the wall from the inside out. Since construction is formed on the mold 36, and the mold is used to shape the composite structure, it is necessary ultimately to remove the mold. After two or three layers have been placed on the mold, the mold can then be removed. At this juncture, it is then appropriate to then start closing the ends of the equipment room. Thus, once a rigid shape is achieved, subsequent additional layers are wrapped around the partially completed vault with a view of covering over the ends. In the ideal construction, the wall is made of multiple and alternating layers of fiberglas matting and woven roving, there being about six to eight layers in the ordinary construction sequence. After a rigid shape has been achieved and after removal of the mold, the construction then encloses the two open ends. This is done by applying alternating layers over the two open ends of the partially completed vault. So to speak, these layers are applied in a U-shape with alternating end covering layers applied horizontally and vertically. In other words, one layer is applied to cover the end and extends along the sides for a few inches to anchor the end cover to the sidewalls. A second end ply is applied to the end, top and bottom walls. The end plies alternate between extending along the sides of the vault (on one ply) and positioning the next end covering ply at right angles; the ends of the second ply are on the top and bottom of the partially completed vault. Several such end covering layers are applied and are interleaved with the plies along the major axis of the partially finished vault. By this approach, the ends can be covered to perfect that portion of the vault and thereby provide a sealed chamber requisite for the equipment room and form a seamless structure.

The chimney is constructed simultaneously with construction of the vault. After the equipment room has been partially constructed with two or three plies but before completing the entire wall thickness of the equipment room, an appropriately sized opening is cut in the top of the partially completed plies for location of the chimney. A mold is inserted therein to define the profile and shape of the upstanding chimney. Then, multiple plies are wrapped around the upstanding mold for the chimney. Each ply (as it is placed on the chimney core) has a tab portion which extends downwardly below the bottom end of the chimney and which is folded into the multiple plies comprising the equipment room. As this proceeds layer by layer, again the suitable polyester resin is applied to the partially constructed chimney to provide structural integrity at each stage to perfect sealing throughout the wall thickness.

To summarize as described to this juncture, the buried vault 10 is constructed by applying layer after layer in multiple plies adhered with polyester resin coatings to assure stiffness and sealing, and the layers are applied in sequence building from the inside out. The equipment room is first partially constructed along its full length, the mold thereafter removed and the ends are then closed over with multiple plies applied in alternating angular positions to accomplish end closure and sealing. The chimney portion is constructed by applying the separate plies around a mold for the chimney adjacent to the partially completed equipment room portion. This continues until the wall required for the chimney has been made sufficiently thick. Each ply is placed on the chimney portion with a folded tab which folds among the several plies used to fabricate the equipment room portion so that the chimney portion is constructed simultaneously with the major portion of the body to assure interweaving of the two portions. This is continued until a sufficient number of plies have been built up on both portions of the structure. At appropriate stages, resin is again applied to adhere and seal the added plies. Seams in a ply are located so they do not overlap with seams of other plies. The molds or cores are separable by applying a gel coat on the surfaces in contact with the constructed wall.

After the several plies in the wall are fabricated, the next step is to cover the entire structure with a light weight core material, the preferable form being light weight balsa wood or Styrofoam TM (a Dow trademark). This enhances the rigidity of the deivce. This is applied to a thickness determined by the load retention required. The entire structure is covered with light weight core material. After that, with the use of a gunite sprayer or other application, an external surface coating is then applied. The preferred form of coating is a spray of a suitable resin mixed with random lengths of randomly distributed glass fibers fibers, matting or roving. The entire surface is sprayed over to assure a leak-proof external wrapping. An insulative layer is applied to exclude water penetration.

Preferred materials for the present apparatus include the gel coat to the thicknesses indicated and somewhere between six and ten layers of alternating fiberglas matting and woven roving. Over that, light weight core material is applied to a thickness between about one-eight inch up to about three inches depending on load requirements. Last of all, the outer coating is applied. As will be understood, the light weight core material 54 is sealed against liquid penetration by the spray-on coating 56. The coating 56 has a thicness up to about one-half inch depending on requirements.

After this construction has been completed, holes can be formed for the vent 18 and for the hatch 16 shown in FIG. 1. These holes are formed in the chimney in a conventional fashion. If desired, the entire top end of the chimney can be left open so that it is closed by separate hatch in a detachable cover. This may be necessary to permit ingress or egress of equipment installed in the structure. Moreover, the vault can be built about the racks which support the equipment after the mold 36 is removed.

The completed product of the present disclosure is a device which can be easily mounted on a flat-bed trailer and hauled any distance without apprehension regarding weight. It is a rugged and substantially shockproof structure. It can be buried to substantial depths and will stand the burden of soil over the equipment room. Moreover, it is constructed to exclude rain and ground water. Last of all, it provides a sealed atmosphere which, with the use of suitable heating and airconditioning equipment, can provide the requisite space for long term safe operation. As desired, small holes can be drilled through the wall to enable connection with the conduit 24 surrounding the optical fiber.

While the foregoing is directed to the preferred embodiment, the scope is determined by the claims which follow:

What is claimed is:

1. A buried vault for enclosing telecommunications equipment underground, the vault comprising:
   (a) an equipment room defining a generally rectangular space therein for receiving telecommunication signal switch gear and optical fiber laser apparatus;
   (b) an enclosure around said room defining top, bottom, side and end walls to provide said space therewithin;
   (c) an upstanding chimney from said room, said chimney and said room being adapted to be buried underground with a top end portion of said chimney accessible from above ground;
   (d) a multilayered wall defining said enclosure and having
      (1) multiple layers of sealed sheet material wherein each layer defines an overlap seam with itself;
      (2) wherein said multiple layers have noncoincidental overlap seams;
      (3) an enclosed sheet of light weight material;
      (4) a water resistant coating including reinforcing fibers on said wall to seal against water intrusion;
      (5) wherein said sealed material layers, light weight material and water resistant coating are parallel and coextensive; and
   (e) openings in said wall for entry of buried telecommunication conduit means to connect with signal switch gear therein.

2. The wall construction of claim 1 wherein said vault wall is made of alternating layers of mat glass fibers and woven roving which are joined together by an applied polymeric resin.

3. The wall construction of claim 1 wherein said wall layers are wrapped concentric around a core, layer on layer, and each of said layers forms a lengthwise sleeve open at two ends, and said ends are closed by multiple plies of similar layers of such material.

4. The apparatus of cliam 3 wherein said multiple layers are covered with a layer of light weight core material up to about three inches thick.

5. The apparatus of claim 4 wherein said laser room is sufficiently tall to enable personnel to stand erect therein, and wherein said chimney is entered by personnel at the top end through a hatch therein.

6. The apparatus of claim 5 wherein said chimney includes a vent opening for air interchange into said laser room.

7. The apparatus of claim 6 wherein said vault has an equipment room having a ceiling sufficiently tall to enable personnel to stand upright therein and said wall is constructed of materials enabling driling through said wall to enable a buried telecommunications conduit means to penetrate into said vault

* * * * *